N. J. C. HUDSON.
GATE OPERATING MECHANISM.
APPLICATION FILED MAY 24, 1915.
1,185,100.
Patented May 30, 1916.
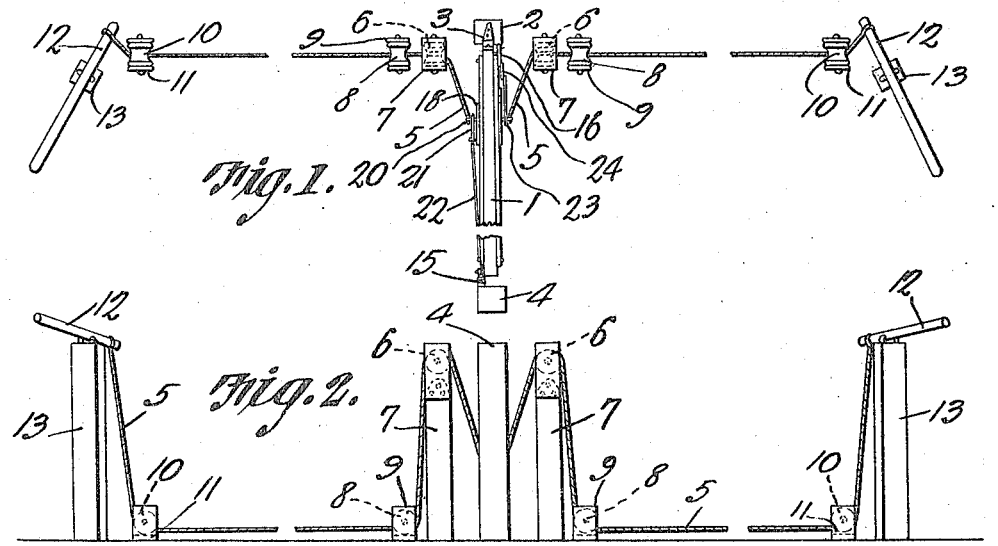
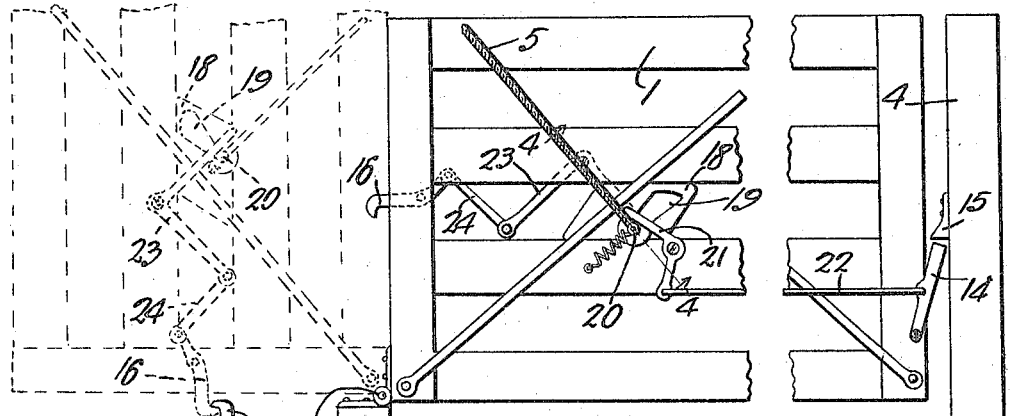
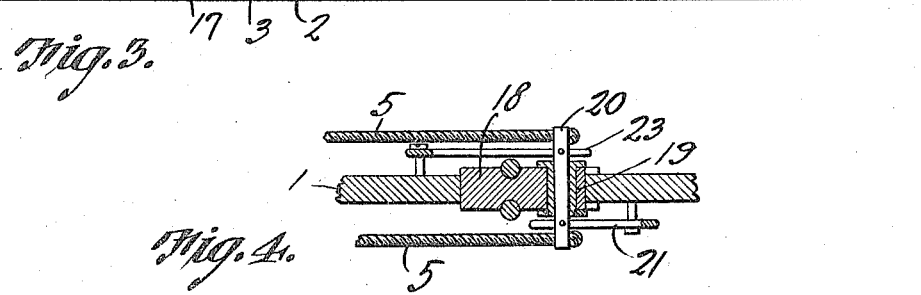
Witnesses
N.J.C. Hudson  Inventor
by　　Attorneys

UNITED STATES PATENT OFFICE.

NORMAN J. C. HUDSON, OF DEARBORN, MISSOURI.

GATE-OPERATING MECHANISM.

1,185,100.  Specification of Letters Patent.  Patented May 30, 1916.

Application filed May 24, 1915. Serial No. 30,154.

*To all whom it may concern:*

Be it known that I, NORMAN J. C. HUDSON, a citizen of the United States, residing at Dearborn, in the county of Platte and State of Missouri, have invented a new and useful Gate-Operating Mechanism, of which the following is a specification.

The present invention appertains to gates, and relates more particularly to a mechanism for operating farm gates.

It is the object of the invention to provide novel and improved means whereby a person in approaching the gate may readily open the same so that passage through the gate way may be had, and whereby when the person leaves the gate way, he may readily close the gate.

Another object of the invention is the provision in a mechanism of the character indicated, means for latching the gate in closed and opened positions, and arranged to be released by the means which is employed for swinging the gate to closed and opened positions.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the gate operating mechanism, portions being broken away. Fig. 2 is an elevation of the mechanism, portions being broken away. Fig. 3 is an enlarged side elevation of the gate and parts carried thereby, portions being broken away, the gate being illustrated in closed position in full lines, and in open position in dotted lines. Fig. 4 is an enlarged sectional detail taken on the line 4—4 of Fig. 3.

In carrying out the invention, there is employed a gate 1 of any suitable or ordinary construction, which has the lower corner at one end hinged to a stake or stub post 2 driven into the ground. The gate 1 is pivoted or hinged to the stake 2 by means of the hinge 3, whereby the gate 1 will stand horizontal when closed, and will stand vertical when opened. A striking post 4 is employed and so positioned that the free end of the gate 1 will be disposed adjacent the post 4 when the gate is closed. The fence (not shown) extends to the stake 2 and post 4 and is properly arranged so that the gate 1 will not interfere with the fence when the gate is raised and lowered. The gate swings in a vertical plane, as will be apparent.

The means employed for raising and lowering the gate embodies a pair of cables, wires or flexible elements 5 having their adjacent ends attached to opposite sides of the gate 1 between the ends of the gate and between the upper and lower edges thereof. The cables 5 extend obliquely upwardly and over upper pulleys or guides 6 carried by the upper ends of a pair of posts 7 supported at the opposite sides of the hinged end of the gate. From the pulleys 6 the cables 5 pass downwardly under a pair of lower pulleys or guides 8 carried by stakes or stub posts 9 supported adjacent the lower ends of the posts 7. From the pulleys 8, the cables 5 extend in opposite directions away from one another to suitable distances from the opposite sides of the gate, and the cables 5 are passed under pulleys or guides 10 carried by stakes or stub posts 11 supported at points remote from the gate and at the sides of the road way, drive or the like. The cables 5 extend upwardly from the pulleys 10 and are connected to levers 12 fulcrumed upon the upper ends of posts 13 supported adjacent the stakes 11. The levers 12 are arranged at the side of the roadway, and are sufficiently elevated so as not to interfere with the traffic, but the levers are readily accessible when a person riding in a vehicle, turns toward the respective side of the roadway and reaches out toward the respective lever.

When a person approaches the gate, he may readily open the same without leaving the vehicle, by operating the respective lever 12 to pull the cable 5 attached thereto, which will swing the gate 1 upwardly, since that end of the respective cable 5 which is attached to the gate is located below the respective pulley 6, in order that a pull exerted upon the respective cable will swing the gate to open position. The cable is preferably pulled with a sharp jerk so that the impetus imparted to the gate will swing the gate over its pivot or hinge to upright position, as illustrated in dotted lines in Fig. 3. The gate will then no longer serve as a barrier for closing the gate way, and the vehicle may readily pass through the gate way, and when the vehicle leaves the gate way, the occupant may readily close the gate by operating the other lever 12 to pull the respective cable 5, which will swing the gate over its pivot or hinge back to closed or lowered position. It should therefore be readily understood how the gate can be opened and closed immediately before and after the vehicle passes through the gateway. The levers or operating members 12 may be positioned at suitable distances from the gate, in order that the gate may be opened and closed properly and without interference.

An upwardly projecting latch 14 is pivoted to the free end of the gate 1 to swing under a keeper 15 carried by the striking post 4 when the gate is closed, and a hook latch 16 is pivoted to the hinged end of the gate to engage a hook 17 supported by or driven into the soil at a point sufficiently spaced from the stake or stub post 2, the latch 16 being engageable with the hook or keeper 17 when the gate is raised to open position. These latches 14 and 16 are operated when the cables 5 are pulled for raising and lowering the gates, as will presently appear.

As a means for operatively connecting the cables 5 and latches 14 and 16, a block or guide 18 is secured to the gate 1 in any suitable manner, and is provided with an oblique or inclined slot 19 through which a pin 20 extends to move freely therein. The ends of the cable 5 are attached in any suitable manner to the ends of the pin 20. A bell crank lever 21 is pivoted to one side of the gate and has one arm bearing upon one end portion of the pin 20, and the other arm of the lever 21 is connected by a connecting rod or link 22 with the latch 14, whereby when the pin 20 is raised or moved upwardly within the slot 19, the bell crank lever 21 will be so swung as to swing the latch 14 from under the keeper 15 to release the latch. A second bell crank lever 23 is pivoted to the opposite side of the gate and has one arm bearing upon the other end portion of the pin 20, and the other arm of the lever 23 is connected by a link 24 to the latch 16, whereby when the pin 20 is moved upwardly within the slot 19, the bell crank lever 23 will be swung properly to swing the latch 16 out of engagement with the keeper 17. The pin 20 normally gravitates to the lower end of the slot 19, and this may be facilitated by means of a suitable spring, if necessary.

When the gate is closed, the latch 14 snaps and drops under the keeper 15, to hold the gate in closed position, to prevent the gate being accidentally raised by the farm stock. The latch 14 may be readily released manually by swinging it away from the keeper 15, so that the gate may be raised directly by hand, if preferred. When one or the other of the cables 5 is pulled to raise the gate, the pin 20 will be first pulled upwardly within the slot 19, which will swing the bell crank lever 21 to withdraw the latch 14 from under the keeper 15, and the gate may then be readily raised to open position as above described. When the gate swings to upright or opened position, the latch 16 engages the keeper 17, to hold the gate raised, in order that the gate will not be blown to closed position by the wind. This avoids a possible injury to the occupants of the vehicle when passing through the gateway. When one cable 5 is operated for closing the gate, the pin 20 will be pulled upwardly within the slot 19, and the bell crank lever 23 will therefore be swung for releasing the latch 16 from the keeper 17 so that the gate may be readily lowered.

Having thus described the invention, what is claimed as new is:

1. In a mechanism of the character described, a gate having one end hinged so that the gate swings vertically, a striking post adjacent which the free end of the gate is arranged when the gate is lowered, a keeper adapted to be supported adjacent the hinged end of the gate, a keeper carried by the striking post, latches carried by the ends of the gate and engageable with the respective keepers when the gate is lowered and raised, a slotted member carried by the gate, a movable member within said slotted member and operatively connected with the latches, and means connected with said movable member for moving it relative to the gate to release the latches and for also swinging the gate vertically.

2. In a mechanism of the character described, a hinged gate, a pivoted latch carried thereby, a keeper, a member carried by the gate and having a slot, an element movable in said slot, a lever pivoted to the gate and bearing against said element to be swung thereby, the lever and latch being operatively connected whereby when the lever is swung by said element, the latch will be swung to released position, and a flexible element attached to the aforesaid element for moving the same to swing the lever and for swinging the gate.

3. In a mechanism of the character described, a gate having one end hinged so that the gate swings vertically, a striking post adjacent which the free end of the gate is disposed when the gate is lowered, a keeper carried by the striking post, a second keeper adapted to be supported adjacent the hinge end of the gate, pivoted latches carried by the free end and hinged ends of the gate and engageable with the first mentioned and second keepers, respectively, a member carried by the gate and having an inclined slot, a pin working in said slot, levers pivoted to the gate and bearing against said pin to be swung thereby, links connecting the levers and latches, and flexible elements attached to the ends of said pin, whereby when the flexible elements are pulled for raising and lowering the gate, said levers are swung for swinging the latches to released positions.

In testimony that I claim the foregoing as my own, I have hereto affixed my signature in the presence of two witnesses.

NORMAN J. C. HUDSON.

Witnesses:
R. H. BRYAN,
J. I. SHARP.

Copies of this patent may be obtained for five cents each, by addressing the "Commissioner of Patents, Washington, D. C."